Feb. 21, 1956  E. J. LEHMAN  2,735,575
SEALING ENCLOSURE FOR TANK
Filed Feb. 17, 1953

INVENTOR.
Eugene J. Lehman
BY
Charles A. Crudell
Attorney

United States Patent Office 2,735,575
Patented Feb. 21, 1956

2,735,575

SEALING ENCLOSURE FOR TANK

Eugene J. Lehman, Zanesville, Ohio, assignor to McGraw Electric Company, Milwaukee, Wis., a corporation of Delaware Application February 17, 1953, Serial No. 337,263

3 Claims. (Cl. 220—46)

This invention relates to a sealing enclosure and in particular to a sealing enclosure for transformer tanks.

Transformer tanks and covers are usually made of steel and are of varied sectional configuration. It is essential that the entire enclosure comprises a very good seal as respects ambient atmosphere during necessary handling and throughout its period of service, to prevent the admittance of moisture, which would deleteriously affect the oil and insulating materials used in transformers. The cover is sometimes welded to the tank, or more commonly is bolted or clamped and sealed by means of a gasket.

There are numerous problems encountered in using gaskets. One is the necessity of expensive machining operations to correct surface irregularities. Another is dependence on the judgment of the person making the assembly. The gasket material may fail under direct pressure. Dimensional control is difficult to achieve, and also the retention of bolts or clamping tightness can be a problem.

The object of this invention is to provide a sealing enclosure for tanks in which the sealing gasket is clamped between free moving parts.

Another object of this invention is to provide a sealing means with a positive closure contact between the cover and the tank.

In greater detail, the object of this invention is to provide a sealing enclosure for a transformer tank in which a slip-fitter is inserted in the opening of an angularly flanged tank and a gasket stretched around the slip-fitter and then the cover pressed down on the slip-fitter, the gasket and the flange, wedging the gasket into the air spaces between the parts.

Other objects will appear from time to time in the course of the specification and claims.

This invention is illustrated in the accompanying drawing in which.

Figure 1:
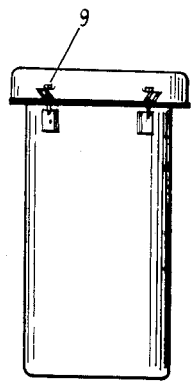
Fig. 1 is a front elevation of a transformer tank.
Figure 2:
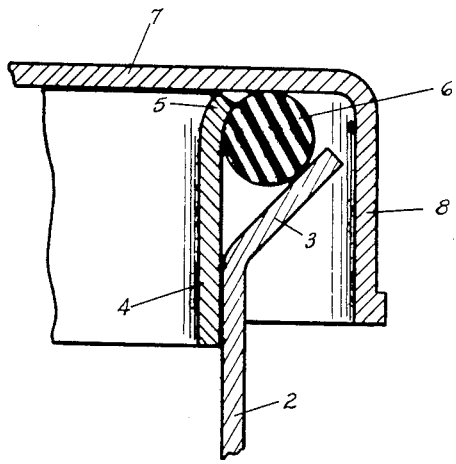
Fig. 2 is a fragmentary sectional view of the sealing enclosure before pressure is exerted.

Fig. 1 illustrates a standard transformer tank 1 which can utilize this novel sealing means. The sectional view Fig. 2 shows the relative movement of the parts. The sides 2 of the tank extend vertically upward and are usually circular in shape. However, the walls could be oval, elliptical, or rectangular with rounded corners instead. The top opening of the tank is shaped with an outwardly and upwardly extending angular flange 3. An internal band or, as it will be described in the specification, a slip-fitter 4 approximating the shape of the inside tank wall but considerably shorter is formed from a material that is relatively light weight and thin in cross sectional dimension so as to readily conform to the inside of the tank 2. The slip-fitter 4 fits loosely within the open end of the tank 2 and at its upper end is flared outwardly slightly as indicated by the reference character 5. A continuous round gasket 6 of some resilient material is stretched around the slip-fitter 4 directly below the flared portion 5 and together they are inserted into the top opening of the transformer tank.

Figure 3:
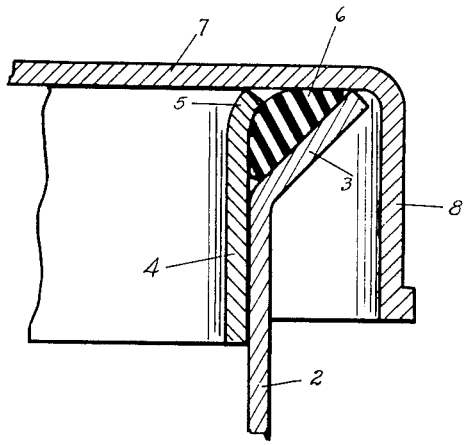
Fig. 3 is a fragmentary sectional view of the sealing enclosure after pressure is exerted.

A cover 7 having a flat underside adjacent to its outer periphery and downwardly flanged sides 8 extending from its outer periphery is placed over the tank 2, the slip-fitter 4, and the gasket 6 and then pressed downwardly on them until the cover 7 strikes the tank flange 3 as shown in Fig. 3. The gasket 6 under pressure flows into the space between the slip-fitter 4, the tank flange 3, and the cover 7, filling the space and preventing air or moisture to seep into the tank. The sealing gasket 6 being resilient flows into the space between the three movable parts and prevents leakage therefrom.

It is also possible to use successfully gaskets of various materials. Besides the resilient materials with their qualities of flow and elasticity, there are the compressible materials such as cork used in its natural state or in combination with a resin or gelatin binder. A gasket comprising cork and rubber would retain some of the characteristics of each and is somewhat compressible as well as elastic and flowable. A sponge rubber gasket processed with a smooth exterior could be used in this sealing device as well as some of the plastic tubings with sealing qualities; the term gasket in the claims is designed to cover all of these variations.

In Fig. 1, I show clamping bolts 9 which are commonly used on transformer tanks to hold the cover on the tank. However, there are numerous fastening means that can be used in conjunction with this sealing device.

This sealing method is a great improvement in the closure of transformer tanks. There are no rigid assemblies which cause distortion to increase difficulties of establishing a fit. Each part fits to the adjoining part with the minimum of adjusting movement. The resilient gasket 6 flows into the space between the movable parts without special attention. The cover 7 comes into contact with the tank flange 3 to provide a positive stop. Over compression of the gasket is prevented. The need for torque control or other means to control the human element is eliminated. The means is provided for employing higher bolting and clamping pressures as assurance against loosening. With this sealing method, a tank closure is provided that necessitates only a few simple parts that cooperate easily and quickly to form an excellent seal for transformer tanks.

I claim:

1. In a tank construction, in combination, a tank casing having a peripherally continuous upwardly and outwardly flaring flange at the open end thereof, a cover for sealing the open end of said casing, a peripherally continuous collar slidably telescoped within said casing and independently movable relative to said cover and said casing, said cover extending over the outer margin of said flange and adapted to seat directly against said flange and said collar and defining therewith an annular enclosed channel having fixed dimensions, and a continuous gasket of pliable material circumjacent said collar within said channel and compressed between said flange, said cover and said collar.

2. In a tank construction, in combination, a tank casing having an outwardly and upwardly flaring flange at the open end thereof, a cover for said casing adapted to seal said open end, said cover having a depending continuous flange spaced radially outward from the external periphery of said casing, a peripherally continuous collar slidably telescoped within said casing and independently movable relative to said casing and said cover, said cover being adapted to seat directly against said upwardly flaring flange and said collar and defining therewith an annular enclosed channel having fixed dimensions, a gasket of pliable material circumjacent said collar and adapted to be compressed within said channel between said upwardly flaring flange and said cover and said collar to provide a moistureproof seal for said casing, and means for securing said cover in clamping engagement against said upwardly flaring flange.

3. In a tank construction, in combination, a tank casing having a bottom wall and a peripherally continuous upstanding wall, said upstanding wall being provided at its upper end with a continuous upwardly and outwardly flaring flange, a cover for said casing, said cover having a continuous depending flange spaced radially outward from said upstanding wall, a peripherally continuous collar slidably telescoped within said casing and independently movable relative to said cover and said casing, gasket means of continuous form circumjacent said collar, and means on said upstanding wall adapted to engage said depending flange to firmly secure said cover to said casing, said cover, when secured to said casing, engaging said upwardly flaring flange and said collar directly and defining therewith an enclosed annular channel having fixed dimensions, said gasket means being confined within said channel between said cover and said collar and said upwardly flaring flange and providing a moistureproof seal for said casing when said cover is secured to said casing.

References Cited in the file of this patent

UNITED STATES PATENTS

| 186,333 | Fowler | Jan. 16, 1877 |
| 667,497 | Carroll | Feb. 5, 1901 |
| 759,081 | Delehanty | May 3, 1904 |
| 967,844 | Scott | Aug. 16, 1910 |
| 1,170,786 | Thomas | Feb. 8, 1916 |
| 1,381,958 | Banks | June 21, 1921 |

FOREIGN PATENTS

| 104,093 | Germany | June 29, 1899 |